(12) United States Patent
Cunico et al.

(10) Patent No.: US 9,595,053 B1
(45) Date of Patent: *Mar. 14, 2017

(54) PRODUCT RECOMMENDATION USING SENTIMENT AND SEMANTIC ANALYSIS

(71) Applicant: International Business Machines Corporation, Armonk, NY (US)

(72) Inventors: Hernan A. Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,346

(22) Filed: Jun. 15, 2016

Related U.S. Application Data

(63) Continuation of application No. 15/010,646, filed on Jan. 29, 2016, now Pat. No. 9,418,375, which is a continuation of application No. 14/870,819, filed on Sep. 30, 2015.

(51) Int. Cl.
*G06Q 30/02* (2012.01)
*G06F 17/27* (2006.01)
*G06F 17/28* (2006.01)
*G06F 17/30* (2006.01)

(52) U.S. Cl.
CPC ..... *G06Q 30/0282* (2013.01); *G06F 17/2765* (2013.01); *G06F 17/28* (2013.01); *G06Q 30/0201* (2013.01); *G06F 17/30864* (2013.01)

(58) Field of Classification Search
CPC ............... G06Q 30/02; G06Q 30/0201; G06Q 30/0205; G06Q 30/0282; G06F 17/30864; G06F 17/28

See application file for complete search history.

(56) References Cited

U.S. PATENT DOCUMENTS

| 8,402,068 B2 | 3/2013 | Clendinning |
| 8,781,916 B1 | 7/2014 | Buryak |
| 2006/0129446 A1 | 6/2006 | Ruhl |

(Continued)

FOREIGN PATENT DOCUMENTS

JP   2011215679 A   10/2011

OTHER PUBLICATIONS

U.S. Appl. No. 15/010,646, filed Jan. 29, 2016.

(Continued)

*Primary Examiner* — Shew-Fen Lin
(74) *Attorney, Agent, or Firm* — Maeve Carpenter

(57) ABSTRACT

In an approach to determine a product rating a computer receives a user request for a product rating. The computer retrieves from on-line sources, product information on the product and analyzes the product information to determine a first product rating. The analysis includes at least a sentiment, and a trend of the sentiment. The approach includes a computer identifying products similar to the product and retrieving from on-line sources product information on similar products. A computer extracts comments on the product from the similar product information and determines an adjustment to the first product rating based on an analysis of the comments and references to the product in the similar product information. The adjustment to the first product rating includes using a sentiment, a trend of the sentiment over time, and a frequency of comments and references to the product over time in the retrieved plurality of similar product information.

1 Claim, 4 Drawing Sheets

(56) References Cited

U.S. PATENT DOCUMENTS

2009/0063247 A1    3/2009   Burgess et al.
2009/0282019 A1   11/2009   Galitsky et al.
2010/0082419 A1    4/2010   Au-Yeung
2010/0153210 A1    6/2010   Oh et al.
2011/0320373 A1   12/2011   Lee et al.
2013/0060648 A1    3/2013   Maskatia
2013/0097176 A1    4/2013   Khader et al.
2014/0108282 A1    4/2014   Pulito et al.
2014/0164380 A1    6/2014   Pavlov et al.

OTHER PUBLICATIONS

List of IBM Patents or Patent Applications Treated as Related (Appendix P), filed herewith.
U.S. Appl. No. 14/870,819, filed Sep. 30, 2015.

PRODUCT RECOMMENDATION USING SENTIMENT AND SEMANTIC ANALYSIS

BACKGROUND

The present invention relates generally to the field of product reviews, and more particularly to a method for creating a product rating that is adjusted for user sentiments and semantic analysis of other similar marketplace offerings.

A wealth of data is available on any topic or product on-line. The ease of access to the Internet or other on-line resources at any time with mobile devices and other computing devices provides the user with growing amounts of information that can be accessed and researched. On-line shopping, in particular, has seen a huge increase in popularity due, in part, to the ability of a user to do on-line comparison-shopping with ease and the simplicity of on-line ordering with direct home delivery of products. On-line information available on a product includes information such as product specifications, product characteristics, product ratings, product reviews, price comparisons, and product attributes such as performance or quality found in product related websites, retail websites, consumer websites, blogs, comments in various social media, and other similar product information sources. Websites for stores may include built-in product comparisons or platform specific analysis tools that a potential customer may utilize to provide a comparison of features and capabilities for a number of similar products in a product category to find an optimum product for their specific needs.

Some websites and associated magazines exist solely to provide customers with independent, unbiased product reviews and comparisons on products from cars, to computers, and washing machines. Additionally, a wealth of product or hobby specific trade journals, magazines, websites, and blogs for topics from computers and gaming to photography and woodworking exist. The internet provides numerous sources of information for product information, product ratings, reviews, and customer comments on virtually any product.

SUMMARY

Embodiments of the present invention provide a method, a computer program product, and a computer system to determine one or more product ratings. The computer program product includes receiving a user request for a product rating for a product. In response, the computer program product includes retrieving from a plurality of on-line sources, a first plurality of product information on the product and determining, a first product rating, based, at least in part, on an analysis of the first plurality of product information. The analysis of the first plurality of product information includes at least, a sentiment, a trend of the sentiment over time, and a frequency of a plurality of comments and references to the product over time. Additionally, the computer program product includes identifying one or more similar products to the product and retrieving from the plurality of on-line sources a second plurality of product information for the one or more similar products. The computer program product includes extracting a plurality of comments and references to the product in the retrieved plurality of similar product information and determining an adjustment to the first product rating based on the plurality of comments and references to the product in the retrieved second plurality of product information. The determination of an adjustment to the first product rating includes at least determining a sentiment, a trend of the sentiment over time, and a frequency of the plurality of comments and references to the product over time in the retrieved plurality of similar product information.

DETAILED DESCRIPTION

Embodiments of the present invention use sentiment analysis and semantic analysis of product information retrieved from on-line sources including comments in social media sites, blogs, websites, product ratings, and reviews to provide an initial product rating for a product. The initial product rating takes into account changes or trends in sentiment over time and the effect of newly introduced products on the frequency of product reviews, product ratings, and comments on the existing product. In addition, embodiments of the present invention identify similar products and retrieve product information on the identified similar products. Embodiments of the present invention extract comments and references to the initially rated product from the product information on the identified similar product and perform sentiment and semantic analysis on the comments and references extracted from the search on similar products. Based on the sentiment and semantic analysis of the comments and references to the product from the similar product information, an adjustment to the initial product rating is determined. Embodiments of the present invention determine the rating adjustment based on sentiment and semantic analysis of comments and references to the product extracted from the similar product information. Additionally, the rating adjustment incorporates the frequency and trend of sentiments determined from the comments and references to the product from product information on similar products. The adjusted product rating is used to determine one or more recommended products or is provided to the user in response to a request for a product rating on a specified product.

Figure 1:
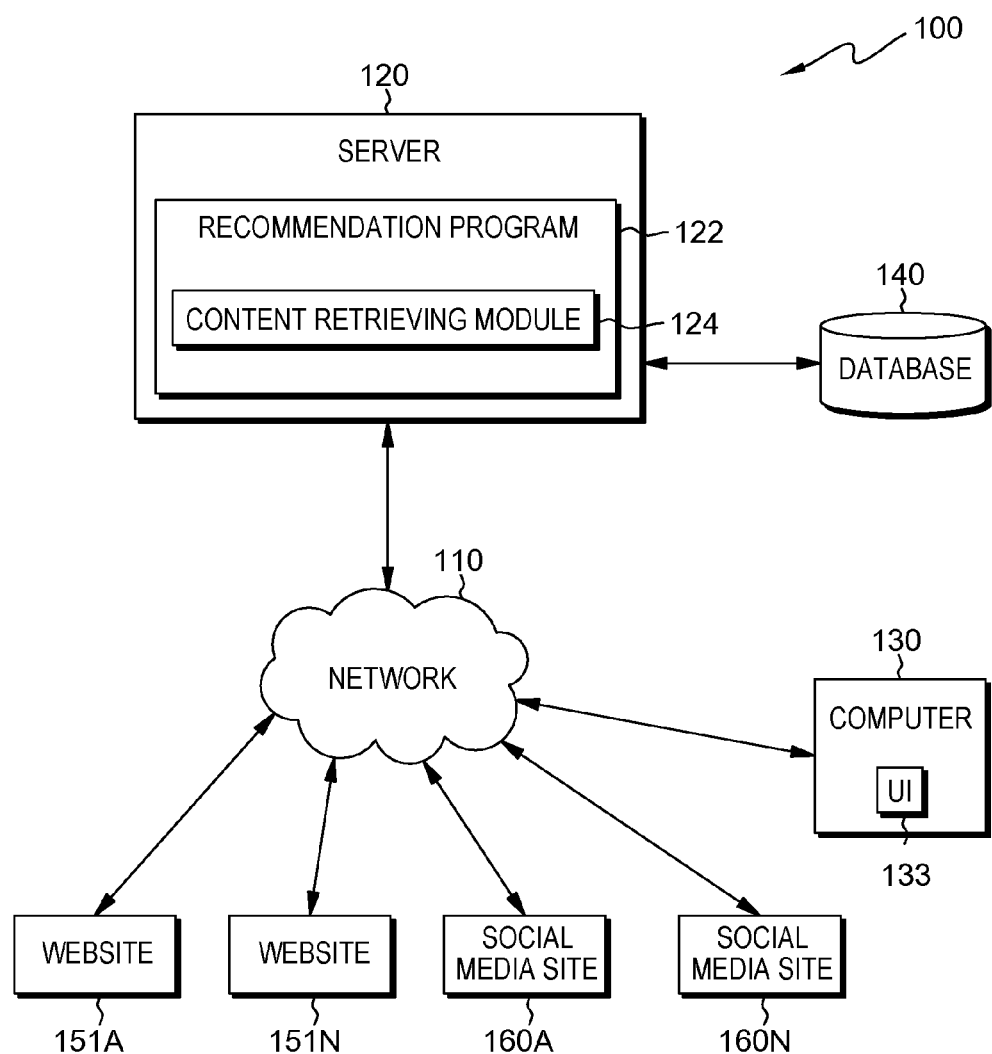
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server 120, computer 130, database 140, websites 151A-N, and social media sites 160A-160N, all interconnected over network 110. Network 110 can be, for example, a telecommunications network, a local area network (LAN), a virtual LAN (VLAN), a wide area network (WAN), such as the Internet, or a combination of these, and can include wired, wireless, virtual, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between server 120, computer 130, database 140, websites 151A-N, social media sites 160A-N, and other computing devices (not shown) within distributed data processing environment 100. In various embodiments, network 110 is a global system of interconnected computer networks that use the Internet protocol suite (TCP/IP) such as the Internet.

Server 120 can be a web server, a management server, a standalone computing device, a database server, a mobile computing device, a laptop computer, a desktop computer, or any other electronic device or computing system capable of receiving, sending, storing, and processing data. In various embodiments, server 120 represents a computing system utilizing clustered computers and components (e.g., database server computers, application server computers, etc.) that act as a single pool of seamless resources, such as in a cloud computing environment, when accessed within distributed data processing environment 100. In various embodiments, each of the programs, applications, and databases on server 120 and computer 130 can reside on various other computing devices with distributed data processing environment 100, provided each has access to information and storage for implementation and operations of the present invention via network 110.

Server 120 hosts recommendation program 122 and content retrieving module 124. Server 120 may be a web server, a laptop computer, a tablet computer, a netbook computer, a personal computer (PC), a desktop computer, a personal digital assistant (PDA), a smart phone, or any programmable electronic device capable of communicating with computer 130, database 140, websites 151A-N, social media sites 160A-N, and any other computing components and devices not shown in FIG. 1 in distributed data processing environment 100. Server 120 is capable of accessing the Internet to retrieve product information and data from various websites or social media sites and service providers. Server computer 120 may include internal and external hardware components, as depicted and described in further detail with respect to FIG. 4.

Recommendation program 122 includes content retrieving module 124. Recommendation program 122 generates a product rating that may be used as a product recommendation. Recommendation program 122 receives from a user a request for a product rating. In an embodiment, a user on user interface 133 on computer 130 may input information on the product such as product name, part number, product version or release (e.g., Version 10 or release 2×), and/or product attributes and may identify similar products that can be sent to recommendation program 122. Recommendation program 122 provides a product rating for one or more user-specified products that are adjusted to reflect a real-time product environment using a multidimensional approach for the evaluation and analysis of the product rating. The products analyzed by recommendation program 122 may be a physical product such as a car, a type of product (e.g., sports utility vehicles (SUVs)), a software product such as an operating system, an article such as "New diabetes treatments", a multimedia product such as a video on how to install ultra-high-speed systems, and a service such as personal trainers or a gym for example.

Recommendation program 122 sends information of the user specified product or products to content retrieving module 124. Content retrieving module 124 using known methods retrieves product reviews, product ratings, articles, and comments on a product of interest from on-line sources such as websites, social media sites such as social networks, blogs, and other similar sources such as company or enterprise on-line resources (i.e., when approved for access). Recommendation program 122 receives the retrieved product information from content retrieving module 124.

Recommendation program 122 analyzes the retrieved comments, reviews, ratings, and articles retrieved on the using natural language processing (NLP), sentiment and semantic analysis to determine the level of satisfaction or dissatisfaction with a product in addition to retrieving and comparing product characteristics to determine an initial product rating. Semantic analysis is a known method of building structures that approximate concepts from a large set of documents in machine learning used in NLP for data interpretation in knowledge-based learning. Using sentiment and semantic analysis, recommendation program 122 determines the acceptance or perception (e.g., positive or negative) of the initial product from the references extracted from data on similar products. Recommendation program 122 tracks the trend of the sentiment on the product. Recommendation program 122 tracks the frequency of comments, articles, ratings, and reviews of the product.

In various embodiments, recommendation program 122 performs a normalization of various ratings or reviews that may be provided by content retrieving module 124 in various forms or formats (e.g., five stars, thumbs up, 6 of 10, or a "like"). Recommendation program 122 is configured to apply a normalization that equates different ratings systems to provide a relative normalized rating (e.g., five stars rating is equivalent to 9 or 10 out of 10 rating and is equivalent to a very satisfied sentiment). In some embodiments, the normalized rating includes the number of the frequency of rating (e.g., many positive ratings have a higher normalized rating than a few positive ratings).

Recommendation program 122 determines an initial product rating which may include information on the time of the last reviews, ratings, or comments on the product. The initial product rating determined by recommendation program 122 incorporates the real-time sentiment, the trend of the sentiment and includes the effect of an introduction of similar products on the frequency of comments, articles, ratings, and reviews of the article in the initial product rating (e.g., a reduction in the frequency of comments and reviews of a product with a trend of decreasing sentiment when a product or products are introduced to the market decreases the initial product rating). In various embodiments, the initial rating may be a normalized rating determined by recommendation program 122. Recommendation program 122 sends the initial product rating with a time stamp indicating a date of creation to database 140. In one embodiment when no similar products are identified, the initial product recommendation is provided as the product rating and used for determining the product recommendation.

Recommendation program 122 recommendation program 122 analyzes the retrieved product information to characterize the product and determine similar products. Product recommendation program 122 determines product categorization, product characterization, product attributes, and identifies similar products using one or more known methods such as extracting information from embedded metadata, tags, using NLP, deep linguistic processing, or other known information extraction techniques to collect data used to classify and characterize the product to be rated. As is known to one skilled in the art, deep linguistic processing is a natural language processing framework that uses theoretical and descriptive linguistics. Deep linguistic processing provides a knowledge-rich analysis through manually developed grammars and language resources capturing long distance dependencies and underlying predicate-argument structures. Using a number of known techniques, recommendation program 122 identifies products that are similar to the product being rated.

Recommendation program 122 develops an understanding of the product which may be a digital single-lens reflex (DSLR) camera, product attributes (e.g., 12× optical zoom), a product classification (e.g., a camera), and a product characterization (e.g., a super zoom digital camera). Recommendation program 122 identifies similar products that may be determined by the program using one or more methods applied by recommendation program 122.

Recommendation program 122 sends the identified similar products to content retrieving module 124. In response, content retrieving module 124 searches on the on-line sources such as websites 151A-N, social media sites 160A-N to retrieve product information on the identified similar products. Content retrieving module 124 sends the retrieved product information on the similar products to recommendation program 122.

Recommendation program 122 adjusts a product's initial product rating based on the analysis of the comments and references to the product extracted from retrieved product information and comments on identified similar products. The adjustment of the initial product rating is based on a multi-dimensional approach using a range of factors. The adjustment of the initial, normalized product rating is determined by the sentiment of the extracted comments and references on the product from articles, reviews, and ratings on identified similar products and may incorporate the timing and frequency of the extracted comments and references analyzed for the rating adjustment. Recommendation program 122 tracks the frequency of comments, articles, ratings, and reviews of the product with respect to products recently introduced or similar products recently introduced and incorporates the frequency of references to the product and trend of the sentiment in the comments ad references to the product extracted from the similar product information. Recommendation program 122 sends the adjusted product ratings to the requesting user on computer 130 and to a database 140 for storage.

Content retrieving module 124 in recommendation program 122 receives a request from recommendation program 122 to perform an on-line search for product information on one or more products. Content retrieving module 124 retrieves information on the product or products identified by recommendation program 122 from on-line sources and the Internet. For example, content retrieving module 124 may search and retrieve information from websites such as websites 151A-N, and social media sites 160A-N, which may be social networking sites or services, blogs, business networks, forums, products/services review, social gaming, video/photograph sharing, company databases, and other on-line sources. For example, websites 151A-N include but, are not limited to product company websites, retail websites for chain stores or big box stores, magazine websites for specific products or for independent product evaluations.

Content retrieving module 124 extracts information on date of creation for retrieved ratings, reviews, and comments that may be included as a time stamp in the retrieved data. Similarly, content retrieving module 124 may extract or retrieve information on product release dates that may be embedded as metadata in the retrieved information. Content retrieving module 124 sends the retrieved product information or data to database 140 for storage. In other embodiments, content retrieving module 124 is a standalone program or search engine, which may reside on one or more computers.

While depicted on server 120, recommendation program 122 may reside on another server, another computing device, or other multiple computing devices. In another embodiment, the code and routines of content retrieving module 124 are integrated into recommendation program 122.

In various embodiments, computer 130 is a client to server 120. Computer 130 includes user interface (UI) 133. Computer 130 may be a notebook, a laptop, a personal digital assistant, a tablet, a smart phone, wearable computing device, or other computing system connected to server 120 via network 110. Computer 130 sends and receives data and information such as requests input by a user on UI 133 for a product recommendation or rating, product ratings and queries to and from recommendation program 122 on server 120 via network 110. Computer 130 may send and receive data from other computing devices (not shown). While computer 130 is depicted as a single client device, multiple computing devices or client devices may communicate and exchange data with recommendation program 122 via network 110. UI 133 on computer 130 is a user interface providing an interface between a user of computer 130 and server 120, and enables a user of computer 130 to interact with programs and data on server 120, computer 130, and other computing devices (not shown). UI 133 may be a graphical user interface (GUI), an active area or line for text inputs, a web user interface (WUI), or other type of user interface and can display product ratings, text, documents, user options, application interfaces, and instructions for operation such as requests for product ratings or queries, and include the information that a program presents to a user. In an embodiment, UI 133 receives a user input via a touch screen, a key board, a mouse, a display, an audio, visual or motion sensing device or other peripheral device standard in computer devices. UI 133 may be used to by a user to generate a request for a product rating or a query and to display to the user the results of the product rating that may be used as a product recommendation.

Database 140 is depicted as a standalone database, however in other embodiments database 140 may reside on server 120. In some embodiments, database 140 may be included on one or more other computing devices (e.g., a cloud), or may be included in one or more databases. Database 140 stores the results of searches by content retrieving module 124, the determined sentiments, initial product ratings and adjusted product ratings sent and retrieved by recommendation program 122. and other information from server 120 or computer 130. Database 140 may reside on one or more computing devices. In an embodiment, database 140 resides on server 120. Database 140 is accessible to computer 130 and server 120 over network 110.

Figure 2:
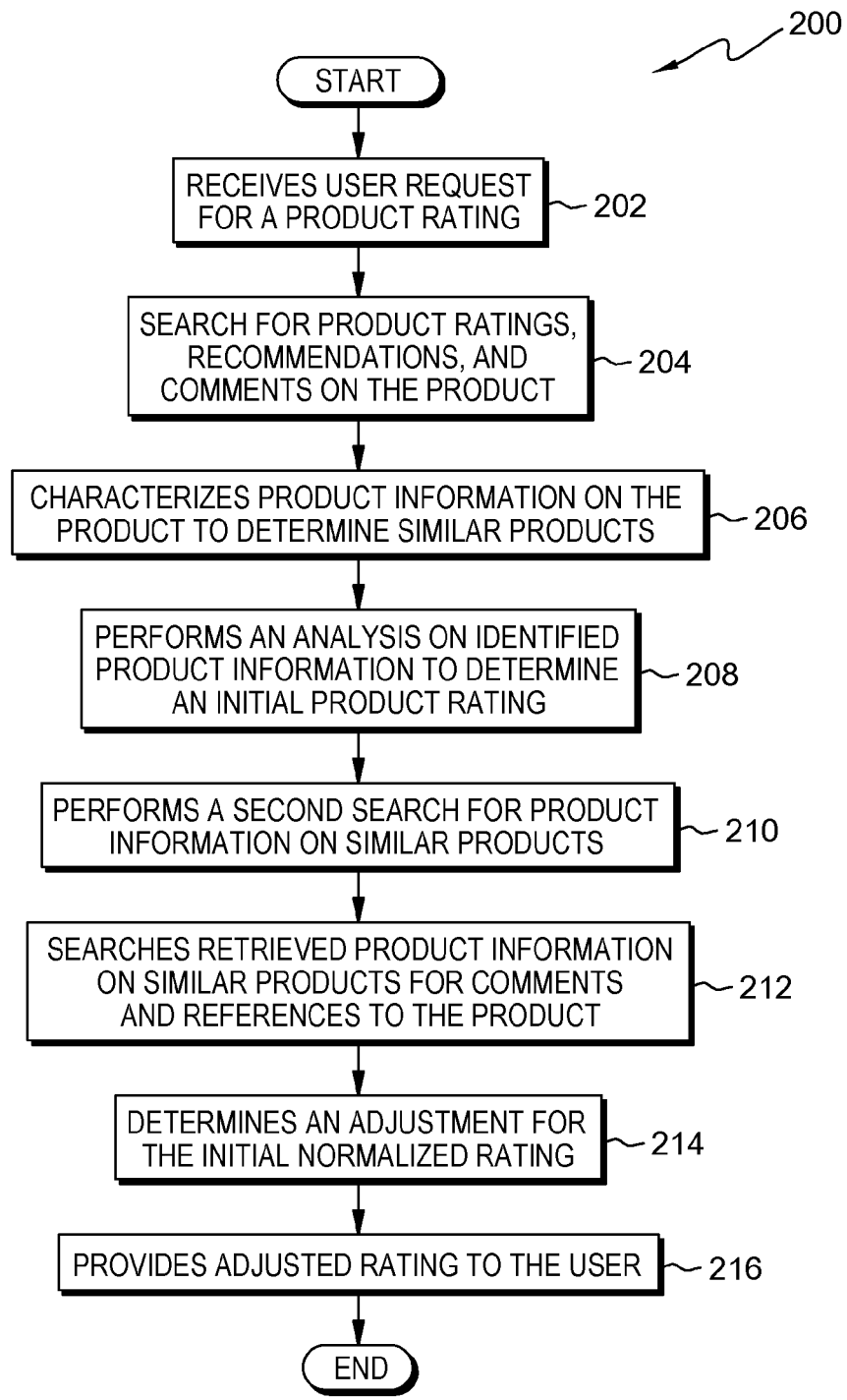
FIG. 2 is a flowchart depicting operational steps of a recommendation program, on a server within the data processing environment of FIG. 1, for providing a product rating, in accordance with an embodiment of the present invention.

FIG. 2 is a flowchart 200 depicting operational steps of recommendation program 122, on server 120 within the data processing environment of FIG. 1, for providing a product rating, in accordance with an embodiment of the present invention. Recommendation program 122 receives a user request for a product rating (202) from computer 130. In some embodiments, recommendation program 122 receives a request for more than one product rating. Using UI 133, a user inputs a request sent via network 110 for a product rating from recommendation program 122 on server 120. Recommendation program 122 receives the request to initiate a product rating, which will be adjusted by recommendation program 122 to reflect the most recent comments and data on the product from ratings, reviews, and comments on similar products. In various embodiments, the request to initiate a product rating includes one or more of the following types of information from the user: a product name, a product level or version (e.g., version 10 of a computer operating system), a product attribute (e.g., a 50× zoom for a digital camera), a product type (e.g., a high speed digital camera), similar products of interest, and a product classification (e.g., a sports car).

Upon receiving a request to initiate a product rating for the identified product, recommendation program 122 using content retrieving module 124 searches for product ratings, recommendations, product reviews, and comments on the product (204). Recommendation program 122 sends the one or more specified products to content retrieving module 124. Content retrieving module 124 searches websites 151A-N and social media sites 160A-N (e.g., Facebook®, Twitter®, etc.) to locate and retrieve information such as product reviews, product ratings, articles relating to the product, and comments on the product. In some embodiments, content retrieving module 124 searches an enterprise, an organization specific database or on-line resource (e.g., Audubon Society), or a company specific (e.g., company XYZ) database, company collaboration sites, company specific social sites or other company specific online resources to retrieve information on a product (e.g., an internal training video on investigation procedures). Content retrieving module 124 uses known systems, tools, or applications such as search engines, browsers, web crawlers, data mining systems, web scraping, or other information retrieval methods to locate and retrieve product information including ratings, reviews, articles, and comments in blogs, websites, or from social media sites. Content retrieving module 124 retrieves comments and product information for the product using the date the comment or information was created. In various embodiments, recommendation program 122 using content retrieving module 124 timestamps retrieved product information with the date the data is created.

In addition, content retrieving module 124 sends a query to database 140 to retrieve data on previous product ratings performed by recommendation program 122, and may receive from database 140 any previous product rating created by recommendation program 122. In various embodiments, the operations of content retrieving module 124 may be performed by recommendation program 122. In some embodiments, recommendation program 122 uses the retrieved ratings as the initial product rating for adjustment. In one embodiment, recommendation program 122 is configured for a user to select a period of time over which the retrieved product ratings to be used as an initial or normalized product rating. For example, a user may select from a pop-up menu or icon a timeframe such as 90 days and recommendation program 122 is configured to accept or use any rating generated by recommendation program 122 in the last ninety days as the normalized product rating. If the retrieved product rating is less than 90 days old, recommendation program 122 uses the retrieved product rating as the initial, normalized product rating for the product. Content retrieving module 124 sends the retrieved product information to recommendation program 122 and a database such as database 140.

Recommendation program 122 upon receiving the product information, characterizes product information on the product to determine similar products (206). A similar product may be a product with one or more of a similar classification (e.g., sports car), one or more similar attributes (e.g., 350 horsepower engine), and one or more similar product characteristics (e.g., 0-60 mph acceleration in 6.4 seconds, a product version (e.g., 2015 model)). Using a number of techniques, recommendation program 122 identifies products that are similar to the product being rated. For example, a user requests a rating for smart phone 1× and upon analyzing the retrieved product information, recommendation program 122 determines that a similar product may have attributes such as 12 megapixels for pictures and 4K video capability.

Recommendation program 122 analyzes the retrieved product information that includes discussions, ratings, reviews, and product specifications from the Internet (e.g., websites, social media sites or services) and other on-line sources such as enterprise, government, or company databases or resources to determine product information and similar products. Recommendation program 122 uses one or more of the following techniques: embedded metadata, tagging, NLP, deep linguistic processing, machine learning algorithms, and the information retrieved by content retrieving module 124 collects data used to classify and characterize the product.

Recommendation program 122 extracts information on product attributes (e.g., product speed or capacity), product version or level, and product release or build date as available in the retrieved information from content retrieving module 124. Recommendation program 122 determines product characteristics, product classification, product attributes, and identifies one or more similar products. In some embodiments, recommendation program 122 utilizes artificial intelligence (AI) and deep neural networks for deep learning architectures used to determine product characteristics and identify similar products for one or more of product classification, product characterization, product attributes, and to identify one or more similar products. As is known to one skilled in the art, a deep neural network is an artificial neural network with multiple hidden layers of units between input and output layers, which can model complex non-linear relationships that may use object detection and parsing for applications such as language modelling.

Recommendation program 122 compares the product attributes, product characteristics, and product type of the product to a plurality of other products in the retrieved product information to determine the similar products. In some embodiments, recommendation program 122 sends product attributes, product characteristics, and product type to content retrieving module 124 to retrieve information or similar products with the same product attributes, product characteristics, and product type. In this case, content retrieving module 124 send the retrieved information or products to recommendation program 122. Recommendation program 122 then compares the retrieved information and products to the product of interest to determine if the products are similar products. Recommendation program 122 provides the one or more determined similar products to content retrieving module 124 and to database 140.

In various embodiments, when the user does not supply information on one or more of the following: product characteristics, product name, product classification, product level or version, product type, product attributes, or an identification of similar products, recommendation program 122 searches the retrieved product information for additional product information not provided by the user. For example, recommendation program 122 may extract product information on technical attributes from a visual media such as a photograph to be rated. Recommendation program 122 may extract from embedded metadata information including creation date, photographer, a subject, and a camera setting such as exposure or zoom. In another example, recommendation program 122 may extract product characteristics, attributes, product specifications, and other information on the product including various product levels from a database, a website, a blog, or a product review.

In some embodiments, recommendation program 122 uses platform specific analysis tools or product comparison tables to determine similar products and to extract product characteristics and product attributes. For example, a retailer's website may include embedded tools, applications, or comparison tables on products that have product data and identify similar products and similar product information (e.g., similar product attributes, etc.) that can be accessed by recommendation program for product information characterization.

Recommendation program 122 sends product information and the identified similar products to database 140.

Recommendation program 122 performs an analysis on identified product information to determine an initial product rating (208). In various embodiments, recommendation program 122 determines an initial product rating based on the sentiment and semantic analysis of the comments, articles, and reviews of the articles, a normalization of ratings, and a consideration of the sentiment trend with the frequency of comments, reviews, and articles on the product. The product information retrieved is analyzed using sentiment analysis and semantic analysis, in addition to analyzing product characteristics, product attribute, and other product information comparisons. Recommendation program 122 uses sentiment analysis and semantic analysis to determine a level of satisfaction or dissatisfaction with the product based on articles, comments (e.g., for example in blogs or social media) and text in reviews and ratings. Sentiment analysis is a known method of identifying and extracting subjective information using NLP, text analysis, and computational linguistics. In addition to sentiment analysis and semantic analysis, recommendation program 122 may utilize knowledge based learning, and software algorithms for AI to analyze product information. Recommendation program 122 records the sentiment with the time of the product information from which the sentiment was determined and sends the determined sentiment with the date of the product information from which it was determined to database 140.

In addition to using sentiment and semantic analysis, recommendation program 122 uses conventional product comparison techniques on the information extracted from the product ratings, product reviews, product specifications, etc. on the identified similar products (e.g., a comparison of car mileage such as 20 miles per gallon to 35 miles per gallon in a product such as a car). For example, recommendation program 122 compares product specifications for product characteristics, product attributes, product levels and/or product release dates from references extracted from articles, reviews, ratings, blogs, or other similar information sources on the product to analyze the product. In another example, recommendation program 122 uses product comparison information provided by one or more platform specific analysis tools such as embedded product comparisons in a retail website.

In some embodiments, recommendation program 122 normalizes ratings for the product retrieved from the product information provided by content retrieving module 124. Recommendation program 122 extracts ratings (e.g., five stars, 4 of out 10, likes, thumbs up, or thumbs down) from articles, posts in social media or retail websites, embedded tools, or product reviews from the retrieved product information and combines the ratings with results or sentiments determined in the sentiment and semantic analysis to include in the determination of the initial product rating. For example, recommendation program 122 is pre-configured to equate a number of different known rating systems used to rate a product. Different rating systems may include but, are not limited to a numerical rating system (e.g., 6 out of 10, 70% satisfied), a star system (e.g., five out of five stars), a thumbs up system (e.g., thumbs up or down), a like system (e.g., like or dislike), and a sentiment analysis (e.g., dissatisfied). For example, recommendation program 122 may be configured to equate 5 out of 10 to a neutral sentiment and to a 3 star rating out of a possible five star rating system, to equate a four star rating to a 8 out of 10 numerical rating to a very satisfied sentiment rating, and to equate a like to a 7 out of 10 and a satisfied sentiment, to equate a thumbs down is equivalent to a 1 out of five, and to a sentiment of dissatisfied and so on.

In various embodiments, recommendation program 122 incorporates the normalized product ratings into the initial product rating using a percentage or weighing factor based on the type of rating system. For example, recommendation program 122 may be configured to determine an initial product rating where 60% of the initial product rating is based on the determined sentiment and 40% of the initial rating is based on the other ratings from other rating systems (i.e., the numerical rating such as 5 out of 10, the star ratings, the thumbs up, the likes, etc.) extracted from the product information and normalized by the program. In an embodiment, the initial product rating is based on the sentiment and semantic analysis. In other embodiments, recommendation program 122 determines the initial product rating based on a change or a trend of the sentiment over the period of time. For example, an initial product rating based on the sentiment (e.g., a positive sentiment) may be revised slightly upward in response an upward or increasing positive sentiment trend based on a sentiment and semantic analysis of reviews, articles, and comments.

In one embodiment, recommendation program 122 provides an initial product rating based, at least in part, on a product life. For example, for a product with a short product introduction time such as six months (e.g., a new computer game), recommendation program 122 may be configured to use the product introduction time to collect ratings or comments for a time period based on the product introduction time. In another embodiment, recommendation program 122 is configured to a product life. The product introduction time may be input by the user or determined by recommendation program 122. For example, if the product introduction for a product is a short product introduction time such as six months, then the product rating may be based on product information from the last six months (e.g., the product life) or from the last year twelve months (e.g., twice the product life) based on the program configuration (e.g., for one product introduction time or for twice the product introduction time).

In various embodiments, recommendation program 122 revises the initial product rating based, at least in part on the number or frequency of articles, reviews, comments, and references to the product. Recommendation program 122 may analyze the trend of the determined sentiment over time and apply a revision to the initial product rating to reflect a frequency of comments and references to the product over time. For example, recommendation program 122 determines a reduction in the number of comments or references to the product is occurring based on analysis of the dates of comments, articles, reviews and ratings of the product and the product has a declining sentiment, and in response, recommendation program 122 revises the initial product rating down slightly. For example, if no comments or references to the product have been identified in the six months and the sentiment was declining in the previous year, then recommendation program 122 may apply a five or ten percent reduction in the determined initial product rating. Similarly, recommendation program 122 may uplift or add a five to ten percent increase in the product's initial product rating when a product has an increasing sentiment and is generating many comments, reviews, ratings, and articles.

The initial product rating includes a time stamp. The time stamp may be used to track the initial product rating as is changes over time. In an embodiment, a user specifies a period of time (e.g., 6 months) for data to be used in the initial product rating. In this example, only data that was generated or posted about the product in the last 6 months is used in determining the initial product rating, where the period of time may be selected by the user.

Recommendation program 122 using content retrieving module 124 performs a second search for product information on identified similar products (210). When recommendation program 122 determines the similar product(s), the program sends the identified similar products to content retrieving module 124. Content retrieving module 124 retrieves product information on the identified similar products. Content retrieving module 124 locates and retrieves similar product information from on-line sources such as the Internet (e.g., websites 151A-N, social media sites 160A-N, blogs, etc.), enterprise, company or government databases product information, and other applicable on-line information sources. The product information on the similar products may include but are not limited to similar product reviews, ratings, articles, product specifications, and comments extracted from articles, reviews, websites, social media, blogs on the similar products. Content retrieving module 124 provides the retrieved product information on the similar products to recommendation program 122 and to database 140.

Recommendation program 122 analyzes the retrieved product information on the similar products for comments and references to the product (212). Recommendation program 122 searches the retrieved similar product information using keyword search, NLP, deep linguistic processing, sentiment analysis, semantic analysis, and other known information extraction (IE) methods to locate and retrieve ratings, comparisons, and comments related to or including a reference to the product or product of interest (e.g., the user requested product for a product rating). Recommendation program 122 analyzes product information from the second search data for information on the identified similar products. Recommendation program 122 extracts references, comments, comparisons of product attributes and characteristics (e.g., data rate, memory size, quality, and/or reliability) for the product from the second search data. The extracted information such as comments and references to the product include a time stamp for date of creation (e.g., using embedded timestamp).

Recommendation program 122 performs a sentiment and semantic analysis on the extracted comments and references to the product from the second search data. Recommendation program 122 determine a level of user satisfaction or dissatisfaction with the product (i.e., sentiment relating to the product) based on the comments extracted from the ratings, reviews, and comments on the identified similar products. The analysis of the comments and references on the product from the product information on the one or more similar products may be completed using sentiment and semantic analysis, knowledge-based software algorithms, and AI. In some embodiments, recommendation program 122 determines the sentiment for the comments and references to the product in the second search data over time and tracks the change in sentiment over time (e.g., using on the time stamp for the creation of the extracted comments and references). In addition, recommendation program 122. records the number of analyzed comments and references over time.

Recommendation program 122 determines an adjustment to the initial product rating (214). In one embodiment, a user indicates or selects a period of time for an adjustment of the initial product rating. For example, the user may select from UI 133 an option to provide an adjustment for the product based on the search of similar product information created in the last month. In various embodiments, recommendation program 122 determines an adjustment to the initial product rating based on the sentiment and semantic analysis of the comments and references to the product extracted from the second search of similar product information that includes one or more of the following: a determination of the real-time sentiment for the product, the trend of the sentiment for the product over time, and the frequency and number of comments and references to the product in the similar product information over time.

Recommendation program 122 retrieves the initial product rating of the product (i.e., created in step 210) from database 140. Recommendation program 122 uses the analysis of the retrieved data of the references, reviews, articles, and comments on the similar products extracted from the second search (i.e., the search for product information on similar products) to determine an adjustment or an adjustment factor for the initial product rating.

Recommendation program 122 analyzes the sentiment, the sentiment trend, and the number of product references and comments in the retrieved articles, comments such as posts or tweets, websites, and blogs on the one or more similar products over time. In some embodiments, recommendation program 122 adjusts the initial product rating based, at least in part, on the real-time sentiment. For example, a sentiment analysis of comments extracted from the product information on similar products may indicate a high level of dissatisfaction with the products quality as compared to similar products and in response, recommendation program 122 reduces the initial product rating. In another example, a large number of positive comments are extracted from the similar product information and in response, recommendation program 122 increases the initial product rating, for example by six to seven percent.

In other embodiments, recommendation program 122 determines a product rating adjustment based on the trend of the sentiment analysis of comments and the number of comments on the product over time extracted from the search of similar products. For example, a product with a slightly negative sentiment and a small decrease in sentiment and/or initial product rating over time receives a significant number of comments extracted from the second search that result in a negative sentiment. In this case, recommendation program 122 may apply an adjustment to the initial product rating decreasing the initial product rating in response to the trends of the sentiment and semantic analysis of the second similar product information (e.g., the comments and references to the product extracted from the second search of similar products). For example, in this case, recommendation program 122 may adjust or decrease the initial product rating by five percent.

Recommendation program 122 may determine that the initial product rating, created in step 210, may be lowered, raised, or stay the same depending on the results of the analysis of the second search data (i.e., the search for references or comments on the product found in the similar product information). The adjustment factor may be any one of a percentage, a flat number scaled by the number of references or comments analyzed, or a change in a textual normalized rating (e.g., a reduction of a rating from excellent to very good).

Recommendation program 122 using recommendation program 122 may determine an adjustment factor based, at least in part, on the timing or the date stamps of the analysis of the various references or comments on the product identified in the second search of similar products. The adjustment factor may take into account how recently the comments were made on the product or the "freshness" of the comment. For example, recommendation program 122 may determine that a large number of negative comments (e.g., a netbook, product Y retrieves data slowly, has poor resolution and image quality compared to a similar product X, a similar netbook as determined by recommendation program 122) were identified and analyzed by recommendation program 122 in the last nine months. However, no or very few new comments, articles, or reviews have been posted on product Y in the last two months. In this case, with few new comments, reviews, or ratings in the last two months, recommendation program 122 determines the initial product rating is "stale" (i.e., not current) when analyzing the results of the second search and in response lowers the initial product rating for product Y (e.g., decreases by five to fifteen percent).

In some embodiments, an adjustment factor to the initial product rating may be determined by recommendation program 122 based, at least in part, on the number references extracted for the extracted comments or references. For example, recommendation program 122 may increase the initial product rating of a tennis racquet model by 1% if the number of positive comments on the tennis racquet in the second search data of similar products are more than 50 and less than 100 and may increase the normalized rating by 3% if the number of positive comments on the tennis racquet are more than 100 and, less than 200, and so on.

In an embodiment, recommendation program 122 determines the adjustment to the initial product rating based, at least in part, on the number of references to the product in the second search data. The period of time may be one of pre-configured in recommendation program 122. Recommendation program 122 may be pre-configured or may be configured by a user input on UI 133 from a pull-menu, pop-up screen, or other user input method as a timeframe or period of time period over which comments on the product are extracted from the second search data. For example, a user may provide a timeframe of six months using a pop-up screen in UI 133 and, in response, recommendation program 122 uses only the results of the analysis of the product comments and references extracted from the second search data that are less than six months old.

Recommendation program 122 provides a product rating to the user (216) where the product rating is the adjusted product rating. Recommendation program 122 adjusts the initial, normalized product rating to an adjusted product rating based on an analysis of sentiments on the product extracted from product information on one or more similar products and sends the adjusted product rating to the user on computer 130 via network 110.

In some embodiments, recommendation program 122 provides a product rating that may be used as a product recommendation based on the analysis processes described above (i.e., the steps 202 through 216 in FIG. 2). For example, an employee of a company sends a request to recommendation program 122 using UI 133 for a company training video on an imaging recognition system. Recommendation program 122 using recommendation program 122 determines that the product classification is a video, the product characterization is a company training video, and the attributes is the specified imaging recognition system. Content retrieving module 124 searches company databases, websites, and any company social media or networking sites for company training videos on the specified image recognition system and for ratings, reviews, and comments associated with any identified training videos. In this example, recommendation program 122 using content retrieving module 124 locates two training videos on the specified imaging recognition system.

In this example, recommendation program 122 provides a product rating, which in this case is the initial product rating for each of the two videos. In this example, recommendation program 122 does not identify any similar products, and therefore no second search or adjustment of the normalized ratings occurs. In one embodiment, recommendation program 122 sends to the user the product and the product rating for the product with the highest, best, or the rating indicating the highest satisfaction level or sentiment from the analysis of the reviews, ratings, and comments on the two training videos. In this case, the product with the highest product rating would be the recommended product. In another embodiment, recommendation program 122 provides the user with all of the products analyzed in response to a query or user request in the order of highest to lowest satisfaction level. In this case, the products are analyzed according to the processes discussed in steps 202 to 216 in FIG. 2 (e.g., include adjusted ratings). In an embodiment, recommendation program 122 provides the user with a configured number of products ranked from highest to lowest based on the analysis of the product information. For example, recommendation program 122 may be configured to provide the five products with the highest level of satisfaction based on the analysis of the product information and the adjusted rating using the results of the second search. The five products with the highest level of satisfaction are the recommended products in this example.

Figure 3:
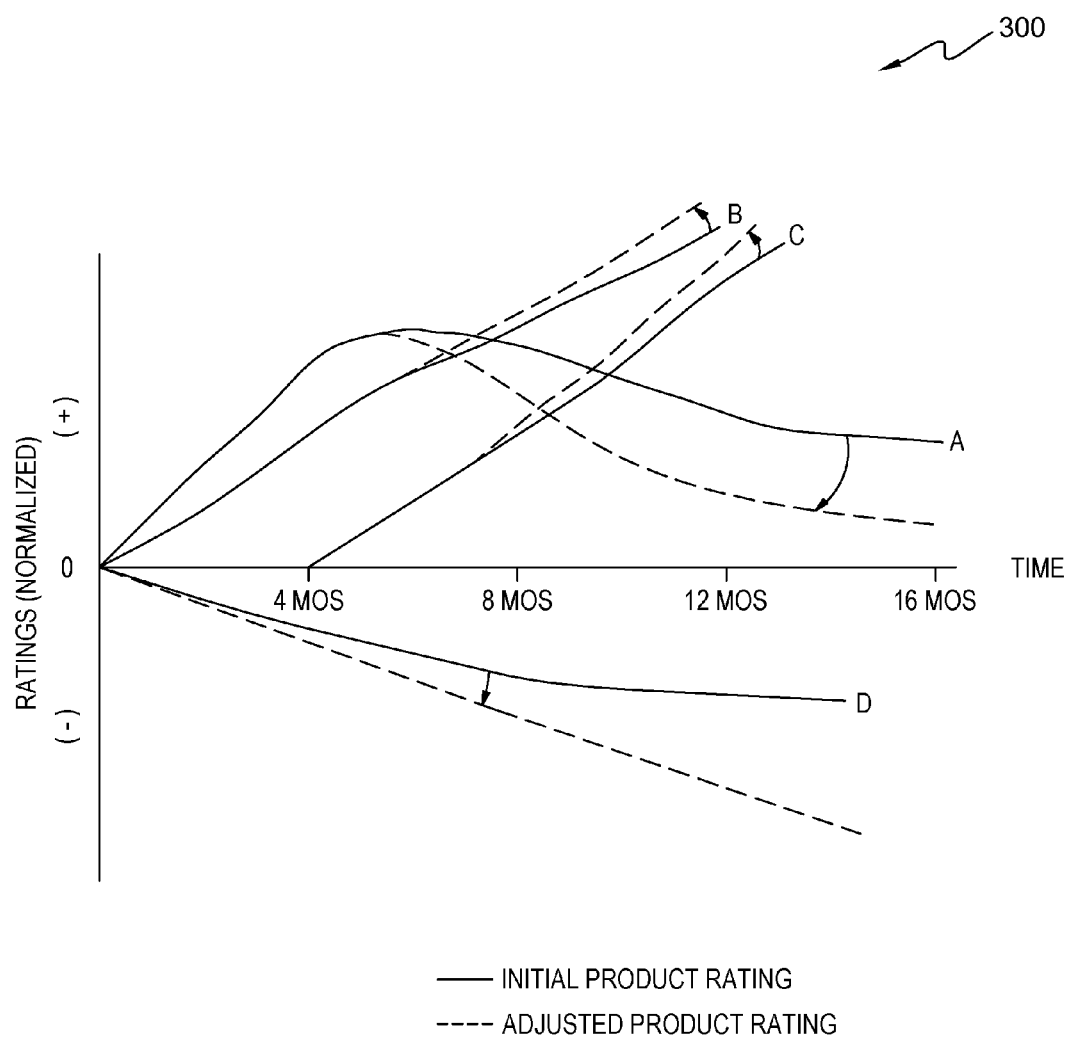
FIG. 3 is an example of a graph depicting an initial product rating and an effect of introduction of a similar product creating an adjusted product rating, based on operation of the recommendation program of FIG. 2, in accordance with an embodiment of the present invention.

FIG. 3 is an example of a graph 300 depicting an initial product rating and the effect of a similar product introduction for an adjusted product rating, based on operation of recommendation program 122, in accordance with an embodiment of the present invention. As depicted, FIG. 3 includes an initial product rating shown as the solid lines for products A, B, C, and D and the adjusted ratings depicted by the dashed lines for products A, B, C, and D. The initial product ratings and the adjusted product ratings are tracked over a 16 month period in FIG. 3. Products A, B, and D are introduced at time 0 and product C is introduced 4 months later. Using the processes and methods discussed in detail in FIG. 2, an initial product rating is determined for each of the products. As depicted in FIG. 3, the initial and the adjusted product ratings are depicted as normalized positive and negative ratings (for the purposes of this example. The initial product rating increases in response to increasing number of positive comments, ratings, and reviews as seen with products B and C (or, similarly decreases when no new ratings, reviews, or comments are retrieved on the product or when an increasing number of negative comments, rating, and reviews generating negative sentiment trend as seen with product D).

As depicted in FIG. 3, the initial product rating may be shown as a function of time. The initial product ratings over time may be positive as depicted with products A, B, and C that illustrate a rise in initial product rating. In the case of product A, the rapid rise is followed by a decline in normalized initial product ratings over time. In the case of Product B, the normalized initial product ratings may increase rapidly or fairly rapidly and then, continue to increase but at a lower rate over time. As in the case of Product D, the normalized initial product ratings may be negative and then, slightly decrease over time as no additional ratings, reviews, or comments are created and analyzed by recommendation program 122.

With the introduction of product C, at time 4 months, where product C is identified as a similar product to products A, B, and D. FIG. 3 depicts the adjustment to the initial product ratings of products A, B, and D in response to the introduction of product C in the marketplace. Upon completion of a second search for articles, reviews, ratings, and comments on product C (i.e., the similar product) at 12 months and an analysis of comments and references relating to each of product A, B, and D, is performed by recommendation program 122. Recommendation program 122 determines an adjustment factor for the initial product ratings for products A, B, and D (as discussed above with reference to steps 210, 212, and 214) as a result of the analysis of the comments and references to products A, B, and D extracted from the product information retrieved on product C (i.e., a similar product). The analysis of the extracted comments and references to product A from the second search on product C results in a rating adjustment factor that decreases, or reduces the rating of product A over time. The comments and comparisons analyzed using sentiment and semantic analysis indicate a less positive or a decrease in the level of satisfaction with product A with respect to the introduction of product C as time goes on and in response, recommendation program 122 decreases the initial product rating.

Product B, however, experiences a slight increase in level of satisfaction corresponding to the introduction of product C, as shown by the adjusted rating in response to the comments and references identified and analyzed as a result of the second search (i.e., the search for articles, reviews, ratings, and comments on Product C). Product D in response to the analysis of the second search of the similar product (i.e., product C), receives a lower level of satisfaction (or a higher level of dissatisfaction) when comments and references related to product D are extracted from product information on product C. In this case, the normalized initial product rating of product D is adjusted downward as shown in FIG. 3.

Figure 4:
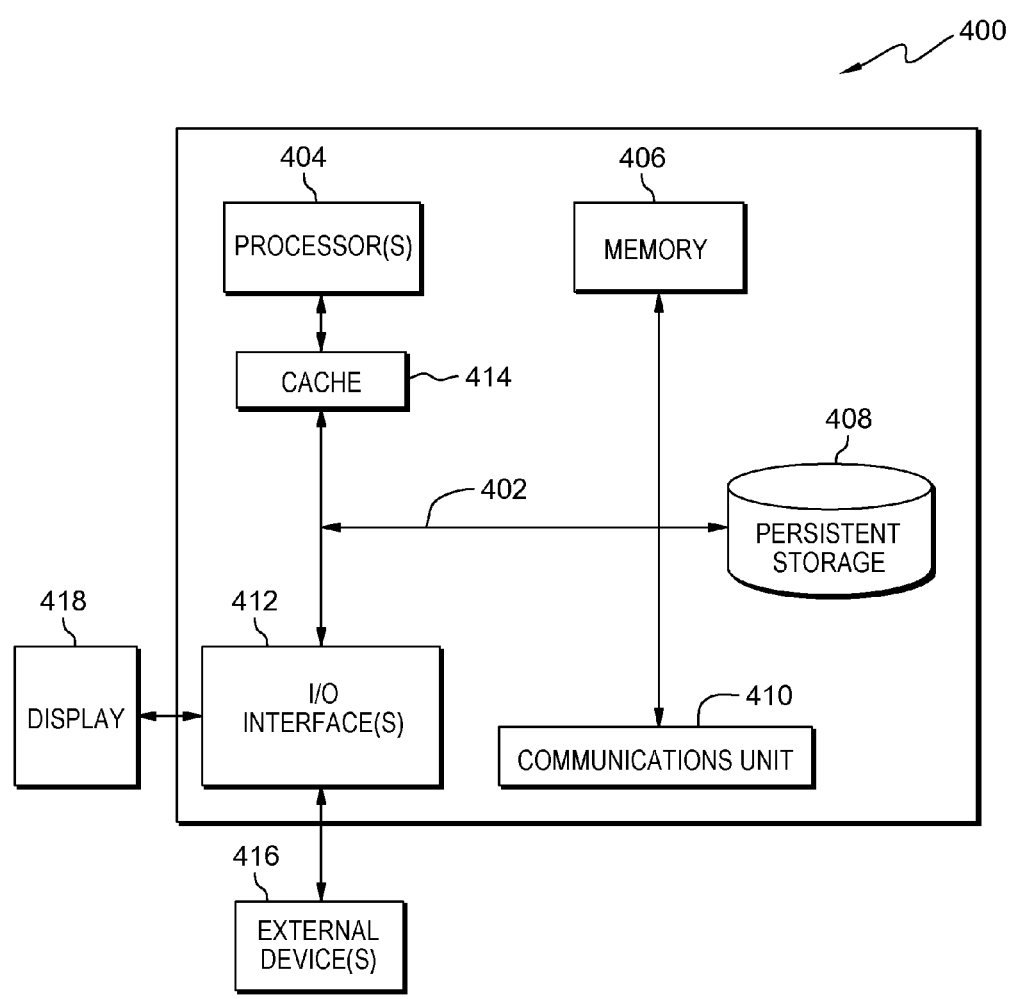
FIG. 4 is a block diagram of components of the server executing the recommendation program, in accordance with an embodiment of the present invention.

FIG. 4 depicts a block diagram 400 of components of server 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of computer processor(s) 404 by holding recently accessed data, and data near accessed data, from memory 406.

Recommendation program 122 and other software for operation of the invention may be stored in persistent storage 408 and in memory 406 for execution by one or more of the respective computer processors 404 via cache 414. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Recommendation program 122 may be downloaded to persistent storage 408 through communications unit 410.

I/O interface(s) 412 allows for input and output of data with other devices that may be connected to server 120. For example, I/O interface 412 may provide a connection to external devices 416 such as a keyboard, keypad, a touch screen, and/or some other suitable input device. External devices 416 can also include portable computer readable storage media such as, for example, thumb drives, portable optical or magnetic disks, and memory cards. Software and data used to practice embodiments of the present invention, e.g., recommendation program 122 can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A computer program product for providing one or more product ratings, the computer program product comprising:

one or more computer readable storage devices, wherein the one or more computer readable storage devices are not a transitory signal per se, and program instructions stored on the one or more computer readable storage devices, the stored program instructions comprising:

program instructions to receive a user request for a product rating for a product;

program instructions to retrieve from a plurality of on-line sources, a first plurality of product information on the product;

the first plurality of product information including ratings, reviews, articles, and comments in one or more of blogs, websites, and social media sites;

program instructions to determine a first product rating, based, at least in part, on an analysis of the first plurality of product information, the analysis of the first plurality of product information including at least, a sentiment, a trend of a sentiment over time, and a frequency of a plurality of comments and references to the product over time, and wherein determining the first product rating includes normalizing, by one or more computers, one or more product ratings extracted from the plurality of product information, wherein normalizing the one or more product ratings includes equating the ratings from one or more rating systems;

program instructions to identify one or more similar products to the product, wherein identifying the one or more similar products to the product comprises:

program instructions to identify one or more of product attributes, product characteristics, and a product type of the first plurality of product information, based on utilizing one or more of the following techniques: embedded metadata, tagging, natural language processing (NLP), deep linguistic processing, and software algorithms utilizing machine learning; and program instructions to send at least one of the one or more product attributes, the product characteristics, and the product type to a content retrieving module to identify one or more similar products with the same of at least one of product attributes, product characteristics, and product type;

program instructions to retrieve from the plurality of on-line sources a second plurality of product information for the one or more similar products, the second plurality of product information on the one or more similar products including product reviews, ratings, articles, product specifications, and comments for the one or more similar products;

program instructions to extract a plurality of comments and references to the product in the retrieved second plurality of product information for the one or more similar products;

program instructions to determine an adjustment to the first product rating based on the plurality of comments and references to the product in the retrieved second plurality of similar product information, wherein the determining includes determining at least one of: a sentiment, a trend of a sentiment over time, and a frequency of the plurality of comments and references to the product over time, and adjusting the first product rating based, at least in part, on one or more of: a number of the extracted plurality of comments and references to the product in the second plurality of product information on the one or more similar products and a change of sentiment over a period of time;

program instructions to apply the adjustment to the first product rating to create a second product rating;

program instructions to send the first product rating and the second product rating to the user, wherein the first product rating and the second product rating each include a time stamp that is used to track the first product rating and the second product rating as changing over time; and program instructions to display the first product rating and the second product rating as a function of time.

* * * * *